(12) United States Patent
Lamesch

(10) Patent No.: US 11,050,958 B2
(45) Date of Patent: Jun. 29, 2021

(54) INFRARED IMAGER NON-UNIFORMITY CORRECTION WITH BAD PIXEL DETECTION AND CORRECTION

(71) Applicant: IEE INTERNATIONAL ELECTRONICS & ENGINEERING S.A., Echternach (LU)

(72) Inventor: Laurent Lamesch, Reichlange (LU)

(73) Assignee: IEE INTERNATIONAL ELECTRONICS & ENGINEERING S.A., Echternach (LU)

(*) Notice: Subject to any disclaimer, the term of this patent is extended or adjusted under 35 U.S.C. 154(b) by 140 days.

(21) Appl. No.: 15/503,085

(22) PCT Filed: Aug. 11, 2015

(86) PCT No.: PCT/EP2015/068452
§ 371 (c)(1),
(2) Date: Feb. 10, 2017

(87) PCT Pub. No.: WO2016/023899
PCT Pub. Date: Feb. 18, 2016

(65) Prior Publication Data
US 2017/0237919 A1 Aug. 17, 2017

(30) Foreign Application Priority Data
Aug. 11, 2014 (LU) .......................... 92 516

(51) Int. Cl.
*H04N 5/367* (2011.01)
*H04N 5/365* (2011.01)
*H04N 5/33* (2006.01)

(52) U.S. Cl.
CPC ............ *H04N 5/3675* (2013.01); *H04N 5/33* (2013.01); *H04N 5/367* (2013.01); *H04N 5/3651* (2013.01)

(58) Field of Classification Search
CPC .... H04N 5/365; H04N 5/3651; H04N 5/2176; H04N 5/357
See application file for complete search history.

(56) References Cited

U.S. PATENT DOCUMENTS

| 6,747,697 B1 * | 6/2004 | Lin ........................ G06T 5/20 |
| | | 250/559.04 |
| 7,684,634 B2 * | 3/2010 | Kilgore .................. G06T 5/002 |
| | | 382/254 |

(Continued)

FOREIGN PATENT DOCUMENTS

KR 101213669 B1 1/2013

OTHER PUBLICATIONS

Russel Hardie, Frank Baxley, Brandon Brys, Patrick Hytla, Scene-Based Nonuniformity Correction with Reduced Ghosting Using a Gated LMS Algorithm, 2009, Optical Society of America, section 2.3 (Year: 2009).*

(Continued)

*Primary Examiner* — Jayanti K Patel
*Assistant Examiner* — Christopher Kingsbury Glover
(74) *Attorney, Agent, or Firm* — Reising Ethington P.C.

(57) ABSTRACT

A camera system includes an imager unit for recording image data and converting the image data into a digital image signal, and a video processing unit operatively connected to the imager unit for receiving the digital image signal from the imager unit and for generating a corrected video output signal. The video processing unit has a dead pixel correction unit and a subsequent non-uniform offset error correction unit. The dead pixel correction unit is configured for correcting the signal of confirmed dead pixels, which are referenced in a map of confirmed dead pixels associated to the dead pixel correction unit. The non-uniform offset error correction unit is configured for correcting readout amplifier non-uniformity and pixel level (Continued)

non-uniformity in the digital image signal. The non-uniform offset error correction unit is further configured for new dead pixel detection simultaneously to the pixel level non-uniformity correction.

4 Claims, 1 Drawing Sheet

(56) References Cited

U.S. PATENT DOCUMENTS

| | | | |
|---|---|---|---|
| 2003/0146975 A1 | 8/2003 | Joung et al. | |
| 2004/0239782 A1 | 12/2004 | Equitz et al. | |
| 2014/0340547 A1* | 11/2014 | Kobayashi | H04N 5/367 |
| | | | 348/247 |

OTHER PUBLICATIONS

Mudau et al: "Non-uniformity correction and bad pixel replacement on LWIR and MWIR images", Electronics, Communications and Photonics Conference (SIECPC), 2011 Saudi International, IEEE, Apr. 24, 2011 (Apr. 24, 2011), XP031993246, ISBN: 978-1-4577-0068-2, DOI: 10.1109/SIECPC.2011.5876937, 5 pages.
International Search Report for International application No. PCT/EP2015/068452, dated Oct. 28, 2015, 4 pages.
Written Opinion for International application No. PCT/EP2015/068452, dated Oct. 28, 2015, 5 pages.

* cited by examiner

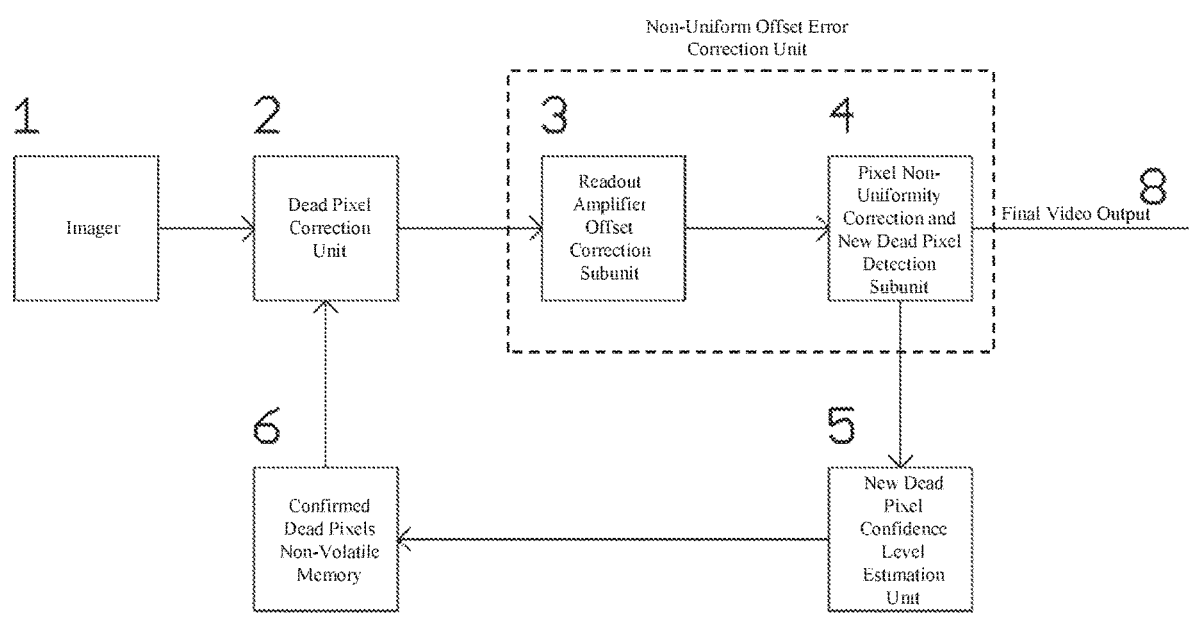

INFRARED IMAGER NON-UNIFORMITY CORRECTION WITH BAD PIXEL DETECTION AND CORRECTION

TECHNICAL FIELD

The present invention generally relates to the technical field of digital imagers such as digital cameras and more specifically to a camera head for an automotive vision system, e.g. an automotive night vision system.

BACKGROUND ART

Digital cameras are increasingly used in automotive vehicles in driver assistance systems or in vehicle safety systems. Cameras are for instance used for monitoring the interior of the vehicle. The information obtained by these interior cameras may be used in order to gather information about seat occupancy, information to be used for seat belt reminder systems or airbag deployment systems. Interior cameras may also be used for driver's state monitoring in general and driver's vital signs monitoring in particular, a use which increases with the penetration of the advanced driver assistance systems, like emergency braking, lane keeping and e-call systems, which may be enhanced by taking into account inputs from the driver state and behavior. In addition, such an occupant monitoring device can fulfill a number of comfort functions as well.

In other applications, digital cameras are used for monitoring the vehicle surroundings in order to assist the driver when parking his vehicle or in order to recognize and localize objects, animals or people in the vicinity of a vehicle trajectory. One example of the latter systems is for instance an automotive night vision system, which assists the driver to detect obstacles and particularly people in the dark.

Camera systems, such as night vision camera systems, comprise a camera head, including the actual imager, and a main processor unit connected to the camera head by means of a data link connection. The camera head is arranged in the vehicle at an appropriate location such that the region of interest lies within the field of view of the imager. For night vision systems, the camera head may e.g. be arranged in the rearview mirror unit of the vehicle.

An infrared imager used e.g. in a night vision system has a non-uniform pixel offset error distribution over the pixel field and at the same time a number of bad pixels which are stuck at a substantially constant intensity level. Over the lifetime of the imager, new dead pixels can appear. In order to achieve an optimal user acceptability of a night vision camera containing the infrared imager, a shutterless non-uniformity correction and a detection and correction of newly formed dead pixels must be implemented.

In order to compensate for the pixel errors, the current state of the art imagers first use a dead pixel processing and then subsequently a non-uniformity correction. Both operations need the implementation of a spatial median filter, but on different levels of the video stream.

Document 'A new algorithm for detecting and correcting bad pixels in infrared images'; Andrés David Restrepo Girón and Humberto Loaiza Correa; INGENIERIA E INVESTIGACIÓN VOL. 30 No. 2, AUGUST 2010 (197-207) describes for instance the detection and correction of dead pixels, both operations mainly based on using the median value of the neighborhood of the currently processed pixel.

Document 'Scene-Based Nonuniformity Correction Technique for Focal-Plane Arrays Using Readout Architecture'; Balaji Narayanan, Russell C. Hardie and Robert A. Muse; Applied Optics, Vol. 44, Issue 17, pp. 3482-3491 (2005) describes a non-uniformity correction, based on a readout amplifier non-uniformity correction, followed by a pixel level non-uniformity correction. The pixel level non-uniformity correction is mainly based on using the median value of the neighborhood of the currently processed pixel.

SUMMARY OF THE INVENTION

It is an object of the present invention to provide a more cost effective imager. This object is achieved by the invention as claimed in claim 1.

A camera system comprises at least one imager unit for recording image data and converting said image data into a digital image signal and a video processing unit operatively connected to said at least one imager unit for receiving said digital image signal from said at least one imager unit and for generating a corrected video output signal. The video processing unit comprises a dead pixel correction unit and a subsequent non-uniform offset error correction unit. The dead pixel correction unit is configured for correcting the signal of confirmed dead pixels, i.e. from those pixels of the imager unit, which are known to be stuck at a substantially constant level. These confirmed dead pixels are referenced in a map of confirmed dead pixels associated to the dead pixel correction unit. The confirmed dead pixel map is for instance initially generated at the end of the production of the imager and stored in a non-volatile memory. The non-uniform offset error correction unit is configured for correcting readout amplifier non-uniformity and pixel level non-uniformity in said digital image signal. According to at least some embodiments of the invention said non-uniform offset error correction unit is further configured for new dead pixel detection simultaneously to said pixel level non-uniformity correction.

The main feature of such embodiments is thus the dual use of the output of a computationally expensive processing part (median filter). The output is used for the residual pixel offset non-uniformity correction and for the new dead pixel detection at the same time.

In a preferred embodiment of the invention said non-uniform offset error correction unit comprises a readout amplifier offset correction subunit and a subsequent pixel residual offset non-uniformity correction subunit, said pixel residual offset non-uniformity correction subunit being configured for computing and outputting said corrected video output signal at a first output and a list of new dead pixels detected in a processed video frame at a second output.

The digital video stream coming from the imager is first fed into a dead pixel correction unit and then into a non-uniform offset error correction unit which is separated into two parts, a readout amplifier offset correction subunit and a subsequent pixel residual offset non-uniformity correction subunit. The pixel residual offset correction subunit is at the same time used for dead pixel detection. The simultaneous use of the pixel residual offset correction subunit eliminates the implementation of a separate dead pixel detection unit, thereby saving costs.

The list of new dead pixels may be directly fed into said map of confirmed dead pixels. In a preferred embodiment however, said list of new dead pixels is fed into a dead pixel confidence level estimation unit, said dead pixel confidence level estimation unit being configured for confirming new dead pixels over a plurality of processed frames and for outputting a list of confirmed new dead pixels, said list of confirmed new dead pixels being fed into said map of confirmed dead pixels.

Said pixel level non-uniformity correction and said new dead pixel detection are preferably based on using median values of pixels adjacent to a currently processed pixel. The neighborhood may preferably be selected among the pixels which are connected to the same readout amplifier than the currently processed dead pixel.

It will be appreciated that the problem of keeping costs down is resolved by using the output of the most computationally expensive computation in the non-uniformity correction with bad pixel detection, namely the median filter of the pixel neighborhood twice, once for the non-uniformity correction, and once for the new bad pixel detection. The benefit is that the median filter does not need to be implemented twice, operating on different levels of the processed video stream.

BRIEF DESCRIPTION OF THE DRAWINGS

Preferred embodiments of the invention will now be described, by way of example, with reference to the accompanying FIG. 1, which shows a simplified circuit diagram of an exemplary embodiment of a camera system in accordance with the teaching of the present invention.

DESCRIPTION OF PREFERRED EMBODIMENTS

Referring to FIG. 1, reference numeral 1 denotes an imager outputting a digital video stream, which is fed into a dead pixel correction unit 2. The video stream with the corrected dead pixels at the output of dead pixel correction unit 2 is fed into the readout amplifier offset correction unit 3. The video stream at the output of readout amplifier offset correction subunit 3 is fed into the pixel level non-uniformity correction and dead pixel detection subunit 4.

The pixel level non-uniformity correction and new dead pixel detection unit 4 has two outputs, the final video output 8, and a list of new dead pixels detected in the current frame. The list contains the coordinates for each newly detected dead pixel, and is fed into the new dead pixel confidence level estimation unit 5. The new dead pixel confidence level estimation unit 5 is finally outputting a list of newly detected dead pixels which is fed into the list of confirmed dead pixels non-volatile memory 6. The list of confirmed dead pixels at the output of the list of confirmed dead pixels non-volatile memory 6 is again fed into the dead pixel correction unit 2.

At the end of production of the imager 1 or complete night vision camera containing imager 1, an initial list of dead pixels is generated by the test systems on the production line. This initial list is stored in the non-volatile memory 6.

The dead pixel correction unit 2 uses as input the video stream coming from imager 1 and the list of confirmed dead pixels coming from non-volatile memory 6. Each pixel in the list of confirmed dead pixels is replaced by a combination of the pixels in its direct neighborhood. For optimum performance of the subsequent readout amplifier non-uniformity correction, the neighborhood should be selected among the pixels which are connected to the same readout amplifier than the currently processed dead pixel. For example, if each of the readout amplifiers of imager 1 is connected to one column of the pixel array, then the neighborhood should be limited to pixels located in the column containing the currently processed dead pixel. Preferably, the pixel directly above and the pixel directly below, or the two pixels directly above and the two pixels directly below the dead pixel are defined as neighborhood. The mean or median value of the neighborhood is calculated and is used to replace the currently processed dead pixel.

As the number of dead pixels is low, typically being below 1% of the total number of pixels, the operations described above do not need a substantial amount of processing power.

The readout amplifier offset correction unit 3 is preferable implemented in the following way. For simplicity, it is assumed that the readout amplifiers are connected to the imager columns.

First, the mean value Cmean_i of each column i is calculated.

Then, these column mean values Cmean_i are filtered temporally, preferably with a first order IIR (infinite impulse response) low pass filter, resulting in Cmeanfiltd_i.

Then, for each column i, the mean or median value Cneighbormean_i of the W left and right neighboring filtered column mean values Cmeanfiltd_j (i−W<=j<=i+W and j≠i) is calculated, typically W is between 1 and 5.

Then, for each column i an estimated column offset Coffset_i is calculated by taking the difference between Cmeanfiltd_i and Cneighbormean_i:

$$Coffset\_i = Cmeanfiltd\_i - Cneighbormean\_i$$

For each column i, this column offset value is then subtracted from all the pixels contained in the column i, thereby removing the offset due to the readout amplifier from the pixels.

The pixel level non-uniformity correction and new dead pixel detection unit 4 is preferably implemented in the following way:

For each pixel p_ik (i being the column index and k the row index of the current pixel), the median value M_ik of its neighborhood is calculated. For example, the 8 or 24 pixels, forming a square with a central hole, surrounding the currently processed pixel are used to calculate the median value M_ik.

Then, the difference D_ik between M_ik and the current pixel p_ik is calculated:

$$D\_ik = p\_ik - M\_ik$$

Then, all the D_ik are filtered temporally, preferably with a first order IIR (infinite impulse response) low pass filter, resulting in Dfiltered_ik. This is the estimated pixel offset.

For each pixel, this estimated pixel offset value Dfiltered_ik is then subtracted from the pixel p_ik, thereby removing the offset on pixel level. The result is the final corrected image frame, constituting the final video output 8.

For the new dead pixel detection, the differences Dfiltered_ik are reused. Each Dfiltered_ik is compared to a predefined positive and negative threshold. If any Dfiltered_ik is higher than the positive threshold or lower than the negative threshold, the coordinates i and k are transferred as new dead pixel to the new dead pixel confidence level estimation unit 5. If there is more than one new dead pixel, a list of the new dead pixel coordinates is transferred.

The new dead pixel confidence level estimation unit 5 checks the validity of the new dead pixels. The i,k coordinate pair of each dead pixel is kept in a confidence list. The list contains in addition to the coordinates, for each entry, a confidence counter which is initially set to zero. If a new dead pixel is detected which is already in the confidence list, the confidence counter is increased by one. The confidence counter of any dead pixel in the list which is not detected in the current frame is decreased by one. The i,k coordinates of all the pixels in the list whose confidence counter is above a certain predefined level ConfThr are being transferred into the list of confirmed dead pixels non-volatile memory 6. This procedure ensures that pixels of the scene which have extreme values are not considered as dead pixels, taking into account that a scene is typically varying over time. ConfThr is typically between 10 and 100000, preferably 500 for a frame rate of 50 frames per second.

The list of confirmed dead pixels non-volatile memory 6 is then again transferred into the dead pixel correction unit 2.

Typically, the units 2 to 6 described above are implemented inside an FPGA, ASIC, DSP or a video processing engine of a system-on-chip, where unit 6 can also be implemented as dedicated off-chip memory.

The invention claimed is:

1. A camera system comprising:
at least one imager unit for recording image data and converting said image data into a digital image signal; and
a video processing unit operatively connected to said at least one imager unit for receiving said digital image signal from said at least one imager unit and for generating a corrected video output signal, wherein said video processing unit comprises:
a dead pixel correction unit being configured for correcting the signal of confirmed dead pixels, said confirmed dead pixels being referenced in a map of confirmed dead pixels associated to the dead pixel correction unit, and
a non-uniform offset error correction unit that includes a readout amplifier offset correction subunit being configured for correcting readout amplifier non-uniformity, and a pixel level non-uniformity correction and dead pixel detection subunit operatively coupled to an output of the readout amplifier offset correction subunit, the pixel level non-uniformity correction and dead pixel detection subunit includes a median filter configured to calculate, for each pixel in the digital image signal, a median value of a neighborhood of pixels surrounding a currently processed pixel,
wherein the pixel level non-uniformity correction and dead pixel detection subunit is configured to calculate an estimated pixel offset value for each pixel in the digital image signal based on the median value, and wherein the estimated pixel offset value is used to simultaneously correct pixel level non-uniformity in the digital image signal to generate the corrected video output signal and to detect new dead pixels in the digital image signal, such that pixel level non-uniformity correction on the digital image signal and new dead pixel detection are performed simultaneously using the same estimated pixel offset value.

2. The camera system according to claim 1, wherein said pixel level non-uniformity correction and dead pixel detection subunit is configured for computing and outputting said corrected video output signal at a first output and a list of new dead pixels detected in a processed video frame at a second output.

3. The camera system according to claim 2, wherein said list of new dead pixels is fed into said map of confirmed dead pixels.

4. The camera system according to claim 2, wherein said list of new dead pixels is fed into a dead pixel confidence level estimation unit, said dead pixel confidence level estimation unit being configured for confirming new dead pixels over a plurality of processed frames and for outputting a list of confirmed new dead pixels, said list of confirmed new dead pixels being fed into said map of confirmed dead pixels.

* * * * *